April 10, 1951 — J. A. BOWER — 2,548,340
APPARATUS FOR DE-AIRING AND DELIVERING PLASTER
Filed July 14, 1948
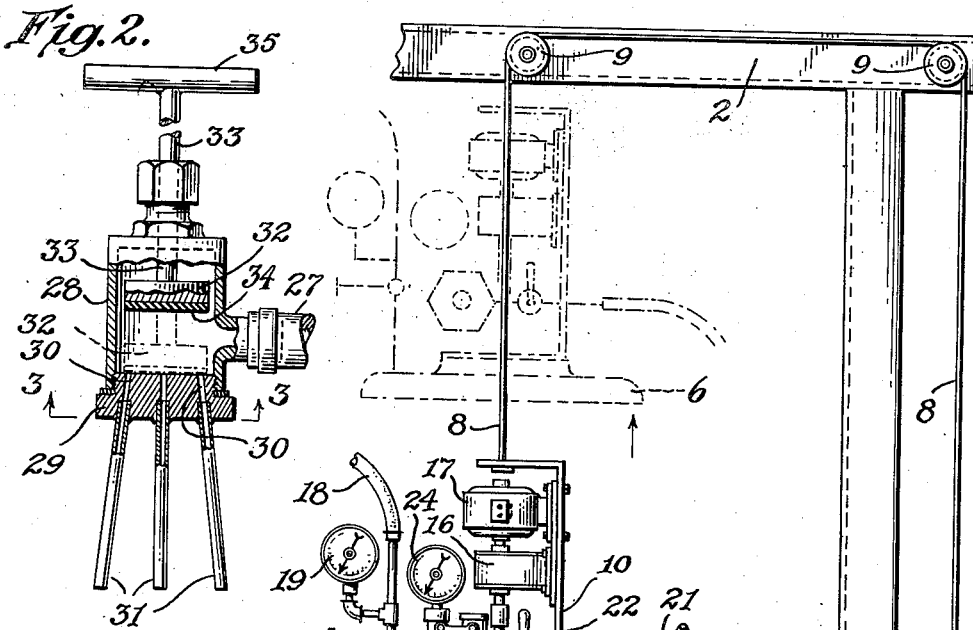
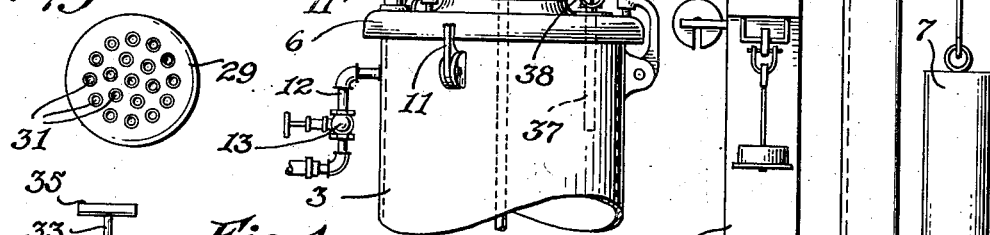
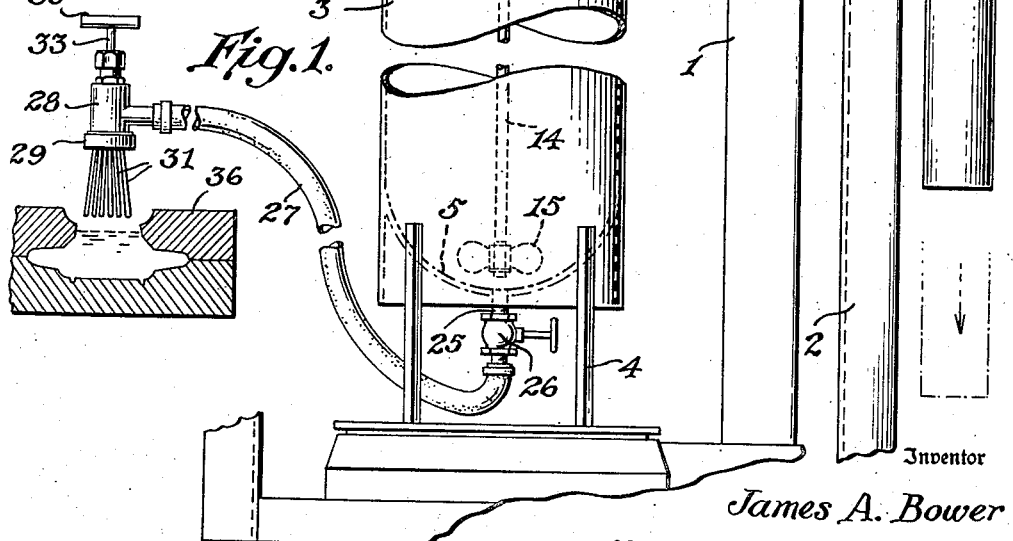
Inventor
James A. Bower Patented Apr. 10, 1951

2,548,340

UNITED STATES PATENT OFFICE 2,548,340

APPARATUS FOR DE-AIRING AND DELIVERING PLASTER

James A. Bower, Chester, W. Va., assignor to The Taylor, Smith & Taylor Company, East Liverpool, Ohio, a corporation of West Virginia Application July 14, 1948, Serial No. 38,723

2 Claims. (Cl. 259—151)

1

The invention relates to the manufacture of plaster-of-Paris pottery molds, and more particularly to an apparatus for mixing and de-airing the plaster and then delivering the plaster in the manufacture of the molds without the de-aired plaster absorbing air in the delivery operation.

One of the objects of the invention is to provide an apparatus by which the amounts and proportion of water and plaster can be quickly and accurately determined.

Another object of the invention is to provide an apparatus by which the water and plaster will be thoroughly mixed and de-aired.

A further object of the invention is to provide an apparatus by which the de-aired plaster may be rapidly delivered, in the forming of plaster molds, and the rapid delivery being effected without the absorption of air by the de-aired plaster.

Another object of the invention is to provide an apparatus of this character which can be rapidly and thoroughly cleansed, to prevent any residue of hardened plaster.

Various other objects and advantages of the invention will be apparent to those skilled in the art, from the following detailed description when taken in connection with the accompanying drawings, in which:

Figure 1 is a front elevational view of the complete apparatus;

Figure 2 is an elevational view, partly in section, of the feeding device; and

Figure 3 is a detail sectional view taken on line 3—3 of Figure 2.

Referring to the drawings in more detail, numeral 1 indicates generally a weighing scale mounted in a frame 2. Numeral 3 refers to a mixing tank which may be provided with legs 4. The mixing tank is shown mounted on the weighing scale 1.

The mixing tank is preferably provided with a rounded concave bottom 5, to assist in preventing any accumulation of dried plaster in the tank. The tank is provided with a removable lid or cover 6, and to assist in lifting and lowering the cover a counterweight 7 is preferably provided; the counterweight being carried by a cable 8 which passes over appropriate pulleys 9 in the frame 2 and is connected to a bracket 10 secured to the cover or lid.

When the cover is in its operative position on the top of the mixing tank it is tightly sealed thereon by the desired number of pivotally mounted screw clamps 11. When the cover and associated parts are to be removed from the tank,

2 the clamps are released and the cover and the parts carried thereby are carried upwardly to the dotted line positions as shown in Figure 1.

In starting the operation, water is first admitted to the tank, as through a pipe 12 provided with a valve 13. When the exact amount of water has been admitted, as accurately determined by the weighing scale, the valve is closed.

The exact amount of plaster desired in the mixture is now added and accurately determined by the weighing scale; the cover, of course, being in elevated position when the plaster is added.

After the water and plaster, in the exact amounts and proportions desired, are in the mixing tank, the cover is lowered and sealed on the tank by the clamps 11.

In order to mix and de-air the contents, agitating and vacuumizing means are provided and such apparatus will now be described. Numeral 14 indicates a shaft suitably journaled in the cover 6 and extending downward centrally of the tank to a point adjacent the bottom thereof. Mounted on the lower end of the shaft 14 is a suitable agitator which, as shown, may be in the form of a propeller 15 having any desired number of blades.

The shaft 14 extends upwardly from the cover and is driven through a gear reducer 16 by any suitable motor such as electric motor 17; the motor and gear reducer being mounted on the bracket 10.

Numeral 18 indicates a vacuum line leading from any desired source of vacuum and connected to the cover 6 to communicate with the interior of the mixing tank 3. This vacuum line is provided with a vacuum and pressure gauge 19 and a valve 20 for regulating the degree of vacuum.

The rotation of the agitator or propeller 15 thoroughly mixes the water and plaster, and the mixing and agitating operation, under vacuum, causes the mixture to be de-aired.

When the mixing and de-airing operation has been completed, the mixture is ready to be delivered for the formation of plaster molds. Numeral 21 indicates an air pressure line connected to the cover 6 to communicate with the interior of the mixing tank. This line is preferably provided with a valve 22, an air regulator 23, and an air pressure gauge 24.

Leading from the bottom of the mixing tank is a delivery pipe 25 provided with a valve 26. A flexible hose 27 leads from the pipe 25 to the substantially cylindrical casing 28 of the feeding device. Secured to the bottom of the casing is a plug or head 29 provided with any desired number of relatively small passages 30, and communicating with each passage and depending from the plug or head 29 is a rigid metal tube 31. These tubes are of relatively small diameter and the number of these small tubes is such that they will rapidly deliver the plaster, but at low velocity.

Numeral 32 refers to a disc valve mounted on the lower end of a valve rod 33, and if desired the valve may be provided with a rubber facing 34. The valve rod has a tight sliding fit in the upper end of the casing, and the upper end of the rod is provided with a hand grip 35 by which the valve can be raised and lowered. When the valve is in raised position the plaster is free to flow through the tubes and when it is moved to its lowermost position to seat on the plug or head 29, the flow to the tubes will cease and the plaster in the tubes will remain therein. As mentioned before, these tubes are of small diameter and hence the plaster will not be easily jarred out when the disc valve is closed between each filling operation.

When the plaster and water in the tank 3 have been completely mixed and de-aired and the mixture is ready to be delivered, the motor 17 is stopped and the source of vacuum is shut off by closing valve 20, and valve 22 is opened to admit air pressure to the tank.

Valve 26 is now opened and the air pressure will force the mixture through the delivery pipe 25 and hose 27 to the feeding device 28. Of course a considerable number of plaster molds are made at the same time, and for this purpose the desired number of the usual plaster-of-Paris cases 36 are suitably arranged to be filled by the operator.

In the casting of plaster-of-Paris molds, the plaster hardens very quickly, and the plaster must be quickly introduced into the forming cases. If a large stream of plaster is rapidly flowed into the cases, as for example, directly from the hose 27, the plaster would absorb considerable air, and hence the benefit of the de-airing operation would be largely lost.

This is avoided, in the present invention, by the feeding device in which the plaster delivered thereto from the hose 27 is fed to the cases through relatively small tubes of such number that they will rapidly fill the plaster-of-Paris cases, but instead of a rapidly moving column there will be a number of small columns moving at relatively low velocity. These slow moving streams avoid the entrapment of air.

Also, in the operation of this invention, it is important, in the charging of one case after another, to avoid the accumulation of plaster, which will quickly harden, on the exterior of the feeding tubes. In the present device, when one case is filled, the disc valve is moved down to seated position to thereby seal the upper ends of the tubes, and thus not only stop the flow of plaster through the tubes but also retain all the plaster in the tubes, and the tubes being of small diameter the plaster will not be dislodged therefrom by jarring between filling operations. The operator then positions the device over the next case, lifts the disc valve to charge the case, and repeats the operation until all of the cases have been charged.

The next operation is to thoroughly clean the entire apparatus, so that there will not be any residue of hardened plaster. Formerly, when buckets were used to fill the cases, this was often a hard and time-consuming task. In the present device, as soon as all of the cases have been poured, air pressure is carried through the tank and feeder to empty, as far as possible, the entire apparatus of plaster. Then the air pressure is shut off by closing valve 22, and the tank is filled with water by opening valve 13, and the motor 17 is started to operate the agitator 15. Then all the water is blown out by opening the air pressure valve 22. The operation may be repeated one or more times to insure thorough cleansing. For use in the washing operation, an overflow pipe 37, having a valve 38, may be provided. Thus pressure will be relieved and water will overflow when the tank is filled. Of course the valve is closed when air pressure is admitted to the tank.

From the foregoing description it will be apparent that I have devised a complete apparatus by which the amounts and proportion of plaster and water can be quickly and accurately determined, by which the plaster and water can be rapidly and thoroughly mixed and de-aired, by which cases for forming the plaster-of-Paris molds can be rapidly poured, but by relatively slowly moving streams to thereby avoid the entrapment of air by the de-aired mixture, and by which the entire apparatus can be quickly and thoroughly cleansed, to prevent any residue of hardened plaster.

Having fully described the invention, what I claim is:

1. In the manufacture of plaster-of-Paris molds, a mixing tank, weighing scales, a water supply line connected with the tank, said tank mounted on the weighing scales to accurately determine the amounts of plaster and water delivered to the tank, a removable cover on the tank, means for mixing and de-airing the contents of the tank, means for forcing the mixture from the tank to the molds in which the plaster-of-Paris molds are formed, all of said means mounted on said removable cover, and counterbalance means connected with said cover.

2. In the manufacture of plaster-of-Paris molds, a feeder for delivering a de-aired mixture of plaster and water, said feeder including a plurality of tubes communicating therewith and depending therefrom, said tubes being of small diameter, the number of tubes being such that the case will be rapidly filled by slowly moving streams, and means for sealing the upper ends of said tubes to stop the flow and retain the mixture in the tubes.

JAMES A. BOWER.

REFERENCES CITED

The following references are of record in the file of this patent:

UNITED STATES PATENTS

| Number | Name | Date |
| --- | --- | --- |
| 485,663 | Scharff | Nov. 8, 1892 |
| 873,345 | Caniff | Dec. 10, 1907 |
| 886,768 | De Borgory | May 5, 1908 |
| 1,194,355 | Bunnell | Aug. 15, 1916 |
| 1,372,172 | Larsen | Mar. 22, 1921 |
| 1,733,410 | Johnson | Oct. 29, 1929 |
| 1,733,724 | Downs | Oct. 29, 1929 |
| 1,965,344 | Josinsky | July 3, 1934 |
| 2,301,461 | Schnetz | Nov. 10, 1942 |
| 2,463,995 | Nielsen | Mar. 8, 1949 |